Patented July 6, 1954

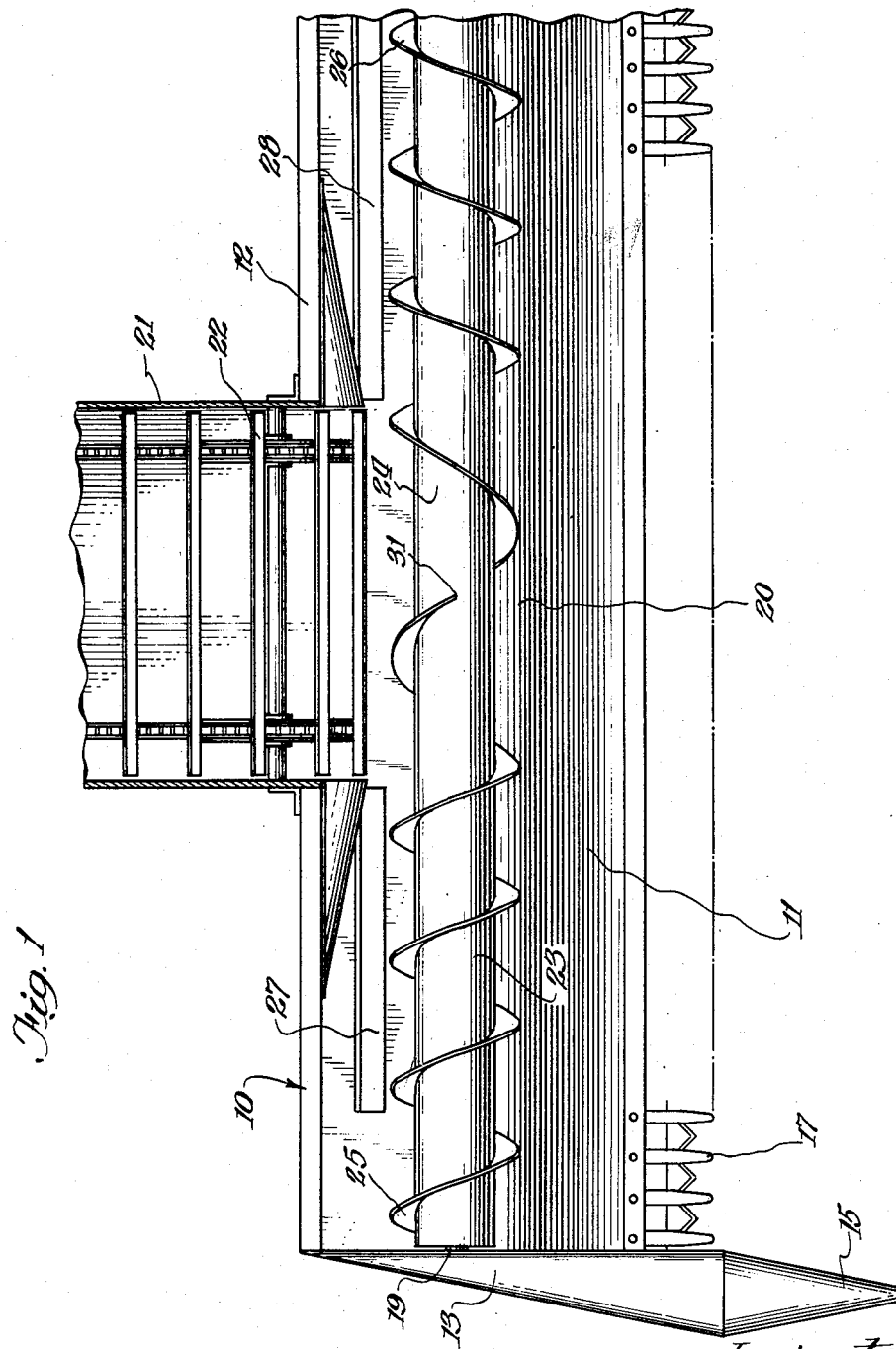

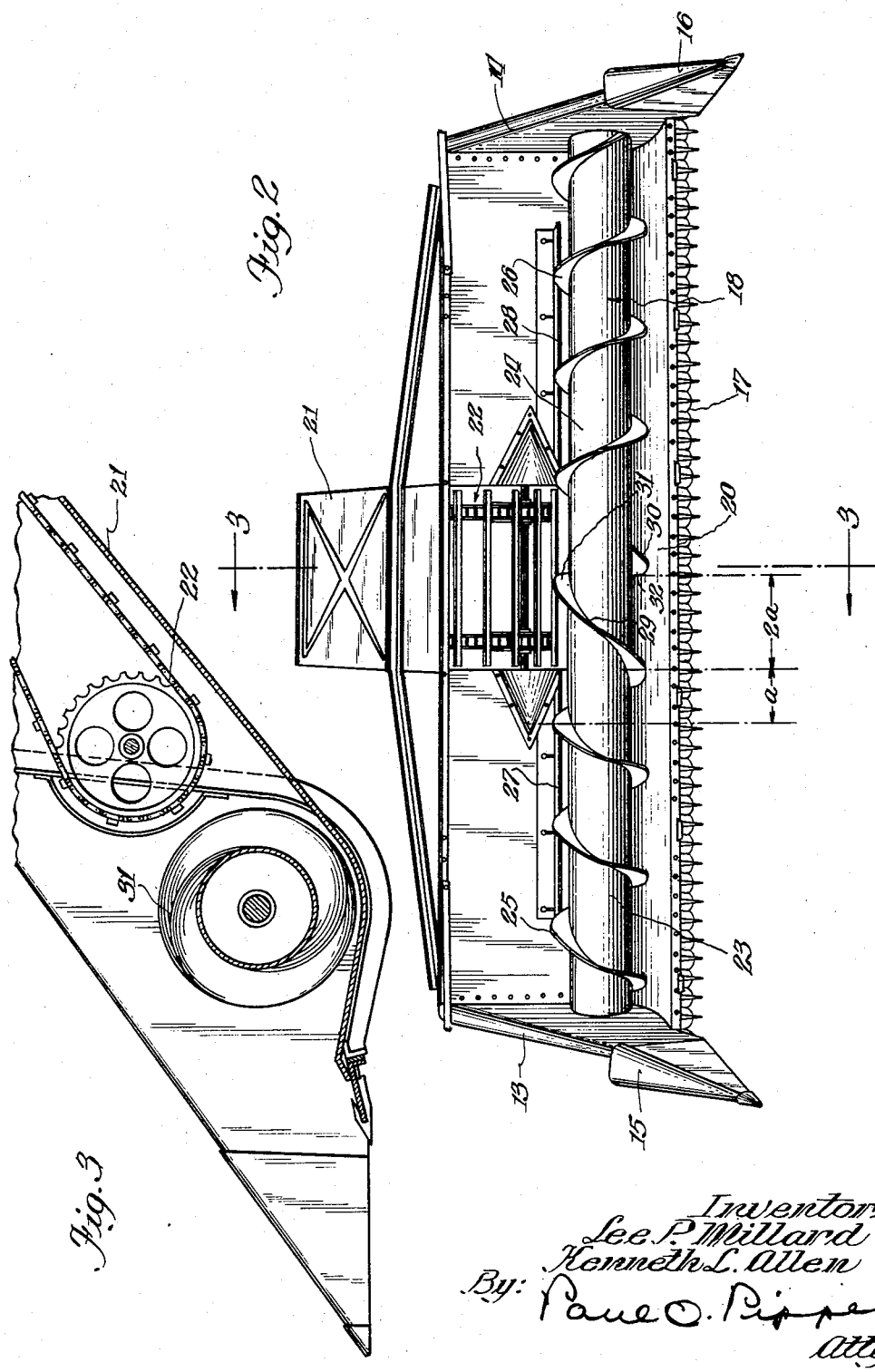

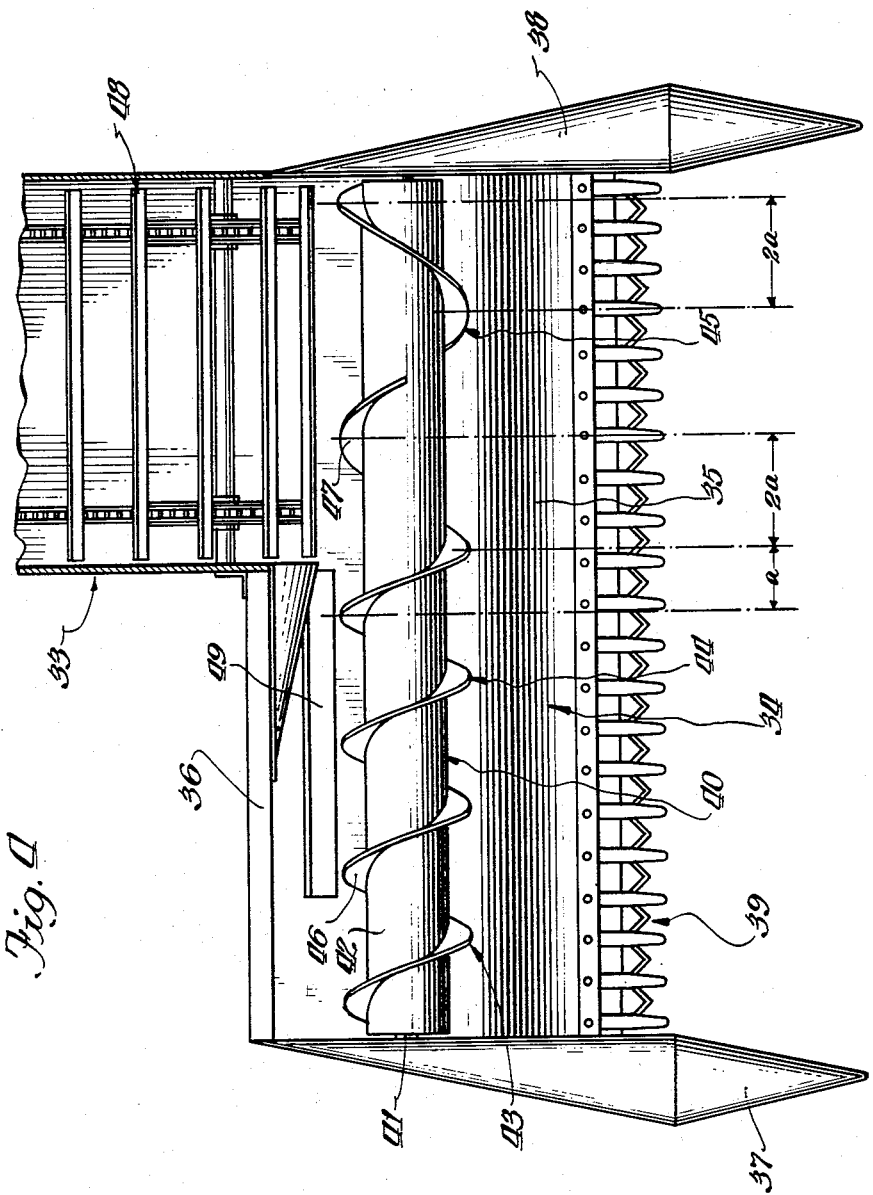

2,682,948

UNITED STATES PATENT OFFICE 2,682,948

STRAIGHT THROUGH AUGER FOR HARVESTERS

Lee P. Millard, Chicago, and Kenneth L. Allen, Rock Island, Ill., assignors to International Harvester Company, a corporation of New Jersey Application July 15, 1950, Serial No. 174,072

1 Claim. (Cl. 198—104)

This invention relates to a new and improved straight through auger for harvesters.

Harvesters and particularly harvester threshers are provided with platforms and conveyors thereon for delivering the material harvested to a separator or the like. Recent developments have proved auger type conveyors as being very suitable for platform use. The harvester platforms are disposed transversely of the line of implement draft whereas the threshing separators are as a rule disposed longitudinally in alignment with the implement draft. It is thus evident that material harvested must be transferred from the platform conveyor at right angles to the separator. Tractor pull behind combines have been generally designed with the longitudinally extending separator positioned at one end of the harvesting platform as such construction was more conducive to proper weight distribution. With the advent of self-propelled combines it has been found more convenient from the standpoint of engineering design to locate the separator centrally of the transversely positioned platform. Thus the platform conveyor had to be equipped with means for carrying material from both ends of the platform toward the center thereof. This has been accomplished by employing two opposed augers which would feed the harvested material to a position centrally between the augers whereupon it was necessary to deliver the material rearwardly to the grain separator. However, the problem of transferring or redirecting harvested material from its transverse movement along a platform rearwardly at right angles thereto at the location of the separator regardless of where that may be is existent in many types of harvesting machines in addition to combines and including such machines as windrow harvesters.

A principal object of this invention is therefore to provide means associated with platform auger conveyors to deliver material at right angles to the auger conveyors.

An important object of this invention is the provision of means in a straight through platform auger and having auger conveying flight arranged in a manner to shift the direction of flow of material at right angles away from the straight through auger.

Another important object of this invention is to supply an auger for harvester platforms continuous throughout the full length of the platform and having flight thereon to deliver material centrally of the continuous auger from both ends thereof and increasing the pitch of the flight at the central portion of the auger to thus reduce the tendency of the flight to feed material longitudinally through itself and to increase the tendency of the flight to throw harvested material laterally away from the auger at the central portion by reason of the increased flight pitch.

Another and still further important object of this invention is to provide a conveying auger for harvester platforms arranged and constructed to initially feed material longitudinally of the auger and thereafter feed and deliver material at right angles to the auger for delivery rearwardly into a separator or other associated device.

Another and still further important object of this invention is to provide an auger conveyor for harvester platforms wherein the lead of the flight on the auger is substantially doubled at the position of desired grain discharge.

A still further important object of this invention is the provision of a straight through auger for harvester platforms having flight means adjacent one end thereof adapted to feed material rearwardly at that one end.

Other and further important objects of this invention will become apparent from the disclosures in the following specification and accompanying drawings.

In the drawings:

Figure 1 is a top plan view of the harvester platform of a harvester thresher incorporating the auger conveyor of this invention.

Figure 2 is a perspective view substantially constituting a front elevation of the device as shown in Figure 1.

Figure 3 is a sectional view taken on the line 3—3 of Figure 2.

Figure 4 is a top plan view of a modified adaptation of the invention.

As shown in the drawings:

The reference numeral 10 indicates generally a harvester platform for use in conjunction with combines or the like. The platform includes a substantially flat floor portion 11 and a substantially vertically disposed back wall 12. The floor and back wall of the platform are joined by end walls 13 and 14 which have forwardly projecting grain dividing points 15 and 16. The forward edge of the harvester platform 10 is equipped with a grain cutting sickle 17.

The platform further includes a centrally feeding straight through auger 18. The auger conveyor 18 is equipped with a center supporting shaft 19 which is generally supported in the end walls 13 and 14 of the platform. The means for rotatably driving the auger conveyor 18 has not been shown but it should be understood that such a means is necessary and is as a rule located in one of the end walls 13 or 14.

A central zone of the platform is designated by the numeral 20. An upwardly and rearwardly extending feeder housing 21 is provided adjacent the rear side of the platform opposite the central zone 20. This feeder housing 21 is located in an opening in the vertically disposed back wall 12 of the platform 10. An undershot feeder 22 is mounted within the feeder housing 21 and is adapted to feed harvested grain upwardly and rearwardly to the threshing and separating mechanisms.

It is thus obvious that in the operation of this harvesting machine the sickle will cut standing grain upon forward movement of the implement through a field of standing grain. As the grain is cut it falls rearwardly onto the auger conveyor 18. Although the auger 18 is continuous throughout its length for all practical purposes it may be designated as two augers 23 and 24 which are adapted to feed material to a position centrally of the platform auger to the zone 20. The half auger 23 is provided with a screw flight 25 and similarly the auger half 24 is provided with a screw flight 26 of equal but opposite pitch. In order to insure effective movement of harvested grain by the auger conveyors stripper bars 27 and 28 are fastened to the back wall 12 of the platform closely adjacent the outer peripheral edges of the screw flight members 25 and 26. These stripper bars are useful in preventing grain or vine-like plants from winding about the core of the centrally feeding auger 18.

The lead or pitch of the screw flights 25 and 26 is expressly designed so that the entire tendency of movement will be axially of the length of the auger. The inner or center end of the screw flight 25 is provided with an extended pitch as shown at 29 which spans half of the center zone 20 of the platform. Similarly the inner central end of the flight 26 is provided with an extended pitch as shown at 30. The extended pitch 30 of the flight 26 spans the other half of the center zone 20 of the platform 10 and it will be apparent that the material fed centrally of the auger 18 is thereafter entirely handled and controlled by an extended pitch flight through the entire center zone 20 of the platform lying adjacent the rearwardly extending feeder conveyor 22. The primary function of the increased pitch or lead of the flights 25 and 26 at their adjacent inner ends is to permit the auger conveyor to loose its hold on the harvested grain and simultaneously to act as bats to throw the grain outwardly and more particularly rearwardly into the undershot feeder conveyor 22 of the upwardly and rearwardly extending feeder housing 21.

The inner ends of the flight 25 and 26 are designated by the numerals 31 and 32 respectively and it should be noted that these ends are diametrically opposed on the core of the auger conveyor 18. The extended leads of the flight at their inner ends and particularly with the diametrically opposite positioning of the ends of the flight provide a substantially paddle feeding effect of the grain from the auger conveyor to the feeder conveyor disposed at right angles thereto.

The regular lead of the flight throughout those portions of the auger 18 outside of the scope of the central zone 20 of the platform has been designated by the letter "a." The initial premise is that this lead "a" is such that its normal tendency will be to feed all grain axially of the auger without any tendency to feed grain or other material laterally of the auger. The increased lead of the flight has been designated on the drawing as being "2a." This means that the lead of the flight throughout the central portion of the platform is double the lead of the flight throughout its axially moving portion. As grain and other material is fed axially of the auger 18 toward the center of the platform it suddenly has its tendency to continue to move axially considerably reduced by reason of the doubling of the flight pitch. Thereafter when the material is in the central zone of the platform the diametrically opposed extended flight leads of the opposed flights 25 and 26 act as bats or paddles to deliver the material from the auger at right angles to the awaiting undershot feeder conveyor 22. It should definitely be understood that although the greatest tendency is to throw material away from the auger at the central portion thereof there is still some tendency to feed longitudinally of the auger and in this respect the auger differs very materially from that type which employs straight paddle members at the center portion of a centrally feeding auger conveyor. It is this slight tendency for continued axial movement of the grain that contributes to an even spreading of grain delivered to the undershot feeder conveyor 22. In other words, axial feeding of the grain is not entirely halted immediately upon the grain reaching the central zone 20 of the platform. But rather the grain is leveled out and fed throughout a substantially even pattern to the undershot feeder conveyor 22 throughout the full width thereof.

As best shown in Figure 4 the auger conveyor of this invention is incorporated in a pull type harvester-thresher wherein the separator 33 is disposed longitudinally to the line of vehicle draft and is located adjacent one end of the front positioned transversely disposed harvesting platform 34. The platform 34 is similar to the platform of Figures 1, 2 and 3 and includes a floor 35, a substantially vertical back wall 36, end grain dividers 37 and 38, and a reciprocating cutter bar 39 extending across the front thereof. An auger conveyor 40 is positioned over the platform floor 35 and journaled for driving rotation within the end divider walls 37 and 38.

The auger 40 is provided with a central shaft 41, a large drum like core 42, and a spiral flight 43. The spiral flight 43 includes a first section 44 and an oppositely pitched section 45. The section 44 has a portion thereof 46 coextensive with the back wall 36 which has a regular pitch of such a degree that material fed thereto will be transmitted axially through the auger toward the location of the separator 33. The pitch of the flight of the portion 46 of the auger is again designated by the letter "a." The section 44 of the auger flight also includes an enlarged pitch portion 47 which lies in front of substantially half of the separator. The pitch of this portion 47 of the flight is shown to be "2a" or in other words twice the pitch of the flight in portion 46. The increased or doubled pitch reduces the tendency toward axial movement of material in the auger and additionally acts as a bat to move material rearwardly away from the auger and into the separator.

The oppositely pitched section 45 of the spiral flight completes the front coverage of the separator 33. This section 45 has a "2a" pitch as it must have a function similar to that of the portion 47 of flight also in front of the separator.

The section 45 of the spiral flight terminates centrally of the width of the separator at a location on the core diametrically opposite the terminus of the flight portion 47. The terminal ends of the flight thus cooperate as bats to feed grain or other material to the separator. The enlarged pitches of the flight contribute to the even distribution of grain over the entire width of the separator.

The separator 33 as in the separator 21 has an undershot feeder conveyor 48 for receiving material delivered from the auger and carrying it upwardly therebeneath. Similarly a stripper bar 49 is fastened to the back wall 36 of the platform to prevent winding of the grain or straw about the large diameter auger core 42.

Numerous details of construction may be varied throughout a wide range without departing from the principles disclosed herein and we therefore do not propose limiting the patent granted hereon otherwise than as necessitated by the appended claim.

What is claimed is:

A harvester platform comprising an auger conveyor thereon, said auger conveyor including a straight through shaft extending across the width of the platform, said auger arranged and constructed to directly receive material fed across the full width of the front of the harvester platform, a feeder conveyor of considerably less width than the harvester platform adjoining the rear of the harvester platform intermediate the ends thereof, said feeder conveyor disposed at right angles to said auger conveyor, said straight through shaft having screw flights thereon arranged in a manner to feed harvested material to a position adjacent said feeder conveyor, said screw flights being of opposite and uniform pitch from the outer ends of the platform inwardly to the side edges of the feeder conveyor, said screw flight continuing across the front of the feeder conveyor from opposite directions to the center thereof, and the pitch of that screw flight in front of the feeder conveyor being substantially twice that of the uniform pitch of the remainder of the screw flight whereby material fed laterally by the auger conveyor will move longitudinally of the auger conveyor until it passes inwardly of the side edges of the feeder conveyor whereafter it is simultaneously fed longitudinally of the auger conveyor and rearwardly thereof.

References Cited in the file of this patent

UNITED STATES PATENTS

| Number | Name | Date |
|---|---|---|
| 2,013,582 | Preisser | Sept. 3, 1935 |
| 2,073,059 | Guthrie | Mar. 9, 1937 |
| 2,155,423 | Korsmo et al. | Apr. 25, 1939 |
| 2,245,997 | Olson | June 17, 1941 |
| 2,260,302 | Driscoll et al. | Oct. 28, 1941 |
| 2,437,460 | DeFrancisci | Mar. 9, 1948 |
| 2,476,265 | Peterson | July 12, 1949 |
| 2,478,009 | Pool | Aug. 2, 1949 |
| 2,509,826 | Krause | May 30, 1950 |
| 2,569,039 | Berthelot | Sept. 25, 1951 |